US010844509B2

(12) United States Patent
Kasuya et al.

(10) Patent No.: US 10,844,509 B2
(45) Date of Patent: Nov. 24, 2020

(54) METHOD FOR MANUFACTURING ALUMINUM PLATE AND APPARATUS FOR MANUFACTURING ALUMINUM PLATE

(71) Applicant: FUJIFILM Corporation, Tokyo (JP)

(72) Inventors: Yuichi Kasuya, Haibara-gun (JP); Hisashi Hotta, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 121 days.

(21) Appl. No.: 16/124,382

(22) Filed: Sep. 7, 2018

(65) Prior Publication Data

US 2019/0003073 A1    Jan. 3, 2019

Related U.S. Application Data

(63) Continuation-in-part of application No. PCT/JP2017/009560, filed on Mar. 9, 2017.

(30) Foreign Application Priority Data

Mar. 25, 2016  (JP) .................. 2016-061799

(51) Int. Cl.
*C25F 3/14* (2006.01)
*C25D 11/24* (2006.01)
(Continued)

(52) U.S. Cl.
CPC ............... *C25F 3/14* (2013.01); *C25D 11/18* (2013.01); *C25D 11/20* (2013.01); *C25D 11/24* (2013.01);
(Continued)

(58) Field of Classification Search
CPC ...................... C25F 3/04; C25F 3/14
See application file for complete search history.

(56) References Cited

U.S. PATENT DOCUMENTS 7,452,473 B1 * 11/2008 Hemphill .................. C23F 1/02
                                                           205/640
7,531,078 B1 *  5/2009 Strange ..................... C25F 3/04
                                                           205/661
(Continued)

FOREIGN PATENT DOCUMENTS

CN    1465079 A    12/2003
CN    1650375 A     8/2005
(Continued)

OTHER PUBLICATIONS

Notice of Reasons for Refusal dated Aug. 27, 2019 issued by the Japanese Patent Office in counterpart application No. 2018-507210.
(Continued)

*Primary Examiner* — Nicholas A Smith
(74) *Attorney, Agent, or Firm* — Sughrue Mion, PLLC

(57) ABSTRACT

An object is to provide a method for manufacturing an aluminum plate having a plurality of through-holes in a thickness direction in which the locations of the through-holes are controlled and a manufacturing apparatus that is used in the method for manufacturing the aluminum plate. A method for manufacturing an aluminum plate of the present invention is a method for manufacturing an aluminum plate having a plurality of through-holes in a thickness direction, the method including a coating-forming step of forming a coating of an aluminum compound on a surface of an aluminum substrate having a thickness of 5 to 1,000 μm, a partial coating removal step of removing, out of the coating, the coating present on portions in which the through-holes need to be formed, and a through-hole-forming step of forming the through-holes in the aluminum substrate by carrying out an electrochemical melting treatment on the aluminum substrate after the partial coating removal step.

19 Claims, 2 Drawing Sheets

(51) Int. Cl.
| | |
|---|---|
| C25F 3/04 | (2006.01) |
| H01M 4/66 | (2006.01) |
| C25D 11/18 | (2006.01) |
| C25D 11/20 | (2006.01) |
| H01M 4/72 | (2006.01) |
| H01M 4/80 | (2006.01) |
| H01G 11/84 | (2013.01) |
| H01G 11/70 | (2013.01) |
| H01G 11/50 | (2013.01) |
| H01G 11/86 | (2013.01) |
| H01M 4/04 | (2006.01) |
| H01G 11/06 | (2013.01) |
| H01G 9/045 | (2006.01) |
| H01M 4/02 | (2006.01) |
| H01G 11/28 | (2013.01) |

(52) U.S. Cl.
   CPC ............... *C25F 3/04* (2013.01); *H01G 11/28* (2013.01); *H01G 11/50* (2013.01); *H01G 11/70* (2013.01); *H01G 11/84* (2013.01); *H01G 11/86* (2013.01); *H01M 4/0438* (2013.01); *H01M 4/661* (2013.01); *H01M 4/667* (2013.01); *H01M 4/72* (2013.01); *H01M 4/80* (2013.01); *H01G 9/045* (2013.01); *H01G 11/06* (2013.01); *H01M 2004/021* (2013.01)

(56) References Cited

U.S. PATENT DOCUMENTS

| | | |
|---|---|---|
| 2003/0154583 A1 | 8/2003 | Fujii et al. |
| 2005/0213286 A1 | 9/2005 | Michel et al. |
| 2016/0294002 A1 | 10/2016 | Matsuura et al. |

FOREIGN PATENT DOCUMENTS

| | | |
|---|---|---|
| JP | 2007-123433 A | 5/2007 |
| JP | 2014-72267 A | 4/2014 |
| JP | 2015-79913 A | 4/2015 |
| WO | 2015/115531 A1 | 8/2015 |

OTHER PUBLICATIONS

Notification of Reason for Refusal dated Jan. 23, 2020 from the Korean Intellectual Property Office in application No. 10-2018-7025842.
International Search Report for PCT/JP2017/009560 dated May 9, 2017 [PCT/ISA/210].
International Preliminary Report on Patentability issued in PCT/JP2017/009560 dated Sep. 25, 2018 [PCT/IB/373].
Written Opinion of the ISA issued in PCT/JP2017/009560 dated May 9, 2017 [PCT/ISA/237].
Communication dated Nov. 4, 2019, from The State Intellectual Property Office of the P.R. of China in counterpart Application No. 201780017185.9.
Extended European Search Report dated Dec. 17, 2018 issued by the European Patent Office in counterpart application No. 17769957.6.
Notice of Final Rejection dated Jul. 13, 2020, from the Korean Intellectual Property Office in Application No. 10-2018-7025842.
Communication dated Sep. 23, 2020, from the European patent Office in application No. 17769957.6.
Communication dated Aug. 4, 2020, from the State Intellectual Property office of the P.R.C in application No. 201780017185.9.

* cited by examiner

METHOD FOR MANUFACTURING ALUMINUM PLATE AND APPARATUS FOR MANUFACTURING ALUMINUM PLATE

CROSS-REFERENCE TO RELATED APPLICATIONS

This application is a Continuation of PCT International Application No. PCT/JP2017/009560 filed on Mar. 9, 2017, which claims priority under 35 U.S.C. § 119(a) to Japanese Patent Application No. 2016-061799 filed on Mar. 25, 2016. The above application is hereby expressly incorporated by reference, in its entirety, into the present application.

BACKGROUND OF THE INVENTION

1. Field of the Invention

The present invention relates to a method for manufacturing an aluminum plate and an apparatus for manufacturing an aluminum plate.

2. Description of the Related Art

In recent years, in response to the development of portable devices such as personal computers and mobile phones, hybrid vehicles, electric vehicles, and the like, the demand for storage devices, particularly, lithium-ion capacitors, lithium-ion secondary batteries, and electric double layer capacitors as power supplies has been intensifying.

It is known that, as electrode collectors that are used for positive electrodes or negative electrodes in the above-described storage devices (hereinafter, simply referred to as "the collectors"), aluminum plates in which through-holes for pre-doping lithium ions are formed are used (WO2015/115531A).

Meanwhile, as a method for manufacturing an aluminum plate for a collector, for example, "a method for manufacturing an aluminum plate having an aluminum substrate including a plurality of through-holes in the thickness direction, the method including an oxide film-forming step of forming an oxide film by carrying out an oxide film-forming treatment on a surface of the aluminum substrate having a thickness of 5 to 1,000 µm and a through-hole-forming step of forming the through-holes by carrying out an electrochemical melting treatment after the oxide film-forming step" is disclosed in claim 1 of WO2015/115531A.

SUMMARY OF THE INVENTION

Recently, in response to the functional improvement, size reduction, or the like of storage devices, there has been an intensifying demand for collectors. For example, in a case in which an aluminum plate is manufactured using the method described in WO2015/11531A, the through-holes are randomly formed on the surface, but it is desirable to regularly form (arrange) the through-holes from the viewpoint of an increase in the efficiency of pre-doping or the like. That is, the control of the locations of the through-holes is required. In addition, the control of the locations of through-holes is also required in applications other than storage devices such as filters and acoustic absorption materials.

Therefore, in consideration of the above-described circumstances, an object of the present invention is to provide a method for manufacturing an aluminum plate having a plurality of through-holes in a thickness direction in which the locations of the through-holes are controlled and a manufacturing apparatus that is used in the method for manufacturing the aluminum plate.

As a result of intensive studies regarding the above-described object, the present inventors found that an aluminum plate having through-holes in controlled locations can be manufactured by carrying out an electrochemical melting treatment while removing, out of the formed coating, the coating present on portions in which the through-holes need to be formed.

That is, the present inventors found that the above-described object can be achieved by means of the following constitutions.

(1) A method for manufacturing an aluminum plate having a plurality of through-holes in a thickness direction, the method comprising:
a coating-forming step of forming a coating of an aluminum compound on a surface of an aluminum substrate having a thickness of 5 to 1,000 µm;
a partial coating removal step of removing, out of the coating, the coating present on portions in which the through-holes need to be formed; and
a through-hole-forming step of forming the through-holes in the aluminum substrate by carrying out an electrochemical melting treatment on the aluminum substrate after the partial coating removal step.

(2) The method for manufacturing an aluminum plate according to (1), in which the coating is formed by carrying out an electrochemical treatment on the surface of the aluminum substrate.

(3) The method for manufacturing an aluminum plate according to (1) or (2), in which the coating is a coating of aluminum oxide.

(4) The method for manufacturing an aluminum plate according to any one of (1) to (3), in which a thickness of the coating is 0.02 to 10 µm.

(5) The method for manufacturing an aluminum plate according to any one of (1) to (4), in which, in the partial coating removal step, the coating is removed by a laser process.

(6) The method for manufacturing an aluminum plate according to any one of (1) to (5), further comprising: a coating removal step of removing the coating after the through-hole-forming step.

(7) An apparatus for manufacturing an aluminum plate which is used in the manufacturing method according to any one of (1) to (6), the apparatus comprising: means for forming a coating of an aluminum compound on a surface of an aluminum substrate having a thickness of 5 to 1,000 µm; means for removing, out of the coating, the coating present on portions in which through-holes need to be formed; and means for forming the through-holes in the aluminum substrate by carrying out an electrochemical melting treatment on the aluminum substrate in which, out of the coating, the coating present on the portions in which through-holes need to be formed has been removed.

As described below, according to the present invention, it is possible to provide a method for manufacturing an aluminum plate which enables the manufacturing of an aluminum plate having a plurality of through-holes in a thickness direction in which the locations of the through-holes are controlled and a manufacturing apparatus that is used in the above-described method for manufacturing an aluminum plate.

DESCRIPTION OF THE PREFERRED EMBODIMENTS

Hereinafter, a method for manufacturing an aluminum plate of the present invention and an apparatus for manufacturing an aluminum plate of the present invention will be described in detail.

In the following description, there are cases in which constituent requirements will be described on the basis of typical embodiments of the present invention, but the present invention is not limited to the above-described embodiments.

Meanwhile, in the present specification, numeric ranges expressed using "to" include numeric values before and after "to" as the lower limit value and the upper limit value.

[Method for Manufacturing Aluminum Plate]

A method for manufacturing an aluminum plate of the present invention (hereinafter, also simply referred to as "the manufacturing method of the present invention") is a method for manufacturing an aluminum plate having a plurality of through-holes in a thickness direction, the method including the following steps (1) to (3).

(1) Coating-Forming Step

A step of forming a coating of an aluminum compound on a surface of an aluminum substrate having a thickness of 5 to 1,000 μm (2) Partial Coating Removal Step A step of removing, out of the coating, the coating present on portions in which the through-holes need to be formed (3) Through-Hole-Forming Step A step of forming the through-holes in the aluminum substrate by carrying out an electrochemical melting treatment on the aluminum substrate after the partial coating removal step.

It is considered that the manufacturing method of the present invention has the above-described constitution and thus a desired effect can be obtained. That is, in the manufacturing method of the present invention, the coating present on the portions in which the through-holes need to be formed is removed by an electrochemical melting treatment before the formation of the through-holes, and thus, in the through-hole-forming step, the aluminum substrate in the coating-removed portions is selectively melted, and consequently, it is possible to manufacture an aluminum plate in which the locations of the through-holes are controlled.

First, the manufacturing method of the present invention will be described using drawings.

FIGS. 1A to 1E are schematic views illustrating an embodiment of the manufacturing method of the present invention in order of steps.

Figure 1A:
FIG. 1A is a cross-sectional view of an aluminum substrate 1 that is used in an embodiment of a manufacturing method of the present invention.
Figure 1B:
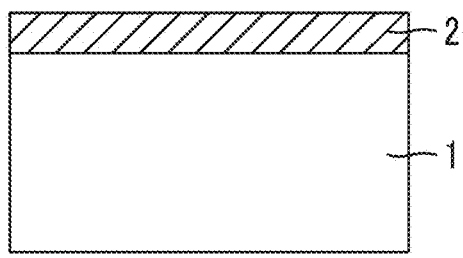
FIG. 1B is a cross-sectional view after a coating-forming step in the embodiment of the manufacturing method of the present invention.
Figure 1C:
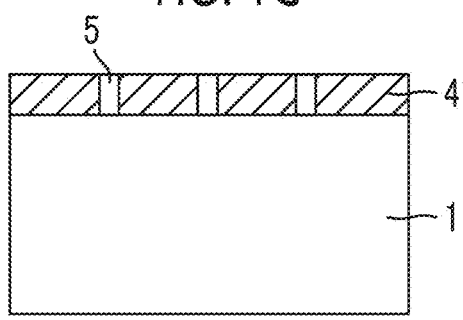
FIG. 1C is a cross-sectional view after a partial coating removal step in the embodiment of the manufacturing method of the present invention.
Figure 1D:
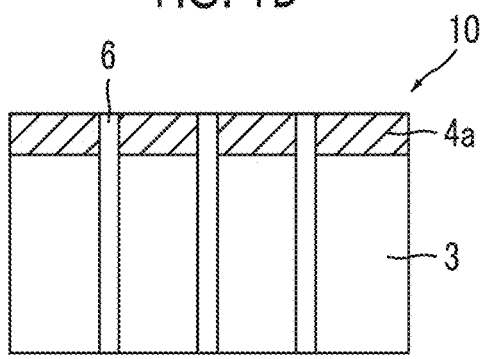
FIG. 1D is a cross-sectional view after a through-hole-forming step in the embodiment of the manufacturing method of the present invention.
Figure 1E:
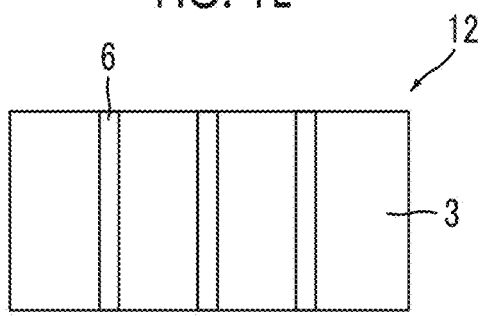
FIG. 1E is a cross-sectional view after a coating removal step in the embodiment of the manufacturing method of the present invention.

FIG. 1A is a cross-sectional view of an aluminum substrate 1 that is used in the embodiment of the manufacturing method of the present invention. First, in the coating-forming step, a coating 2 is formed on a surface of an aluminum substrate 1 (FIG. 1B). Next, in the partial coating removal step, out of the coating 2, the coating present on portions in which the through-holes need to be formed is removed. As a result, pores 5 are formed in the portions in which the through-holes need to be formed out of the coating 2, and the coating 2 turns into a coating 4 having the pores in the portions in which the through-holes need to be formed (FIG. 1C). After that, in the through-hole-forming step, an electrochemical melting treatment is carried out on the aluminum substrate 1 on which the coating 4 is formed so as to form through-holes 6 in the aluminum substrate 1 on which the coating 4 is formed, thereby obtaining an aluminum plate (having the coating) 10 made up of an aluminum substrate 3 having the through-holes and a coating 4a having the through-holes (FIG. 1D). Furthermore, in a coating removal step, the coating 4a having the through-holes is removed, thereby obtaining an aluminum plate (having no coating) 12 made of the aluminum substrate 3 having the through-holes (FIG. 1E). Meanwhile, the coating removal step is a random step.

Hereinafter, the respective steps will be described in detail.

[Coating-Forming Step]

The coating-forming step is a step of forming a coating of an aluminum compound on a surface of an aluminum substrate.

The coating being formed is preferably a coating that is formed by carrying out an electrochemical treatment such as anodizing on a surface of an aluminum substrate.

The coating being formed is preferably a coating having a higher electric resistance than aluminum, and examples thereof include an aluminum oxide coating, an aluminum hydroxide coating, and the like. Among them, an aluminum oxide coating is preferred since the effect of the present invention is more favorable.

The thickness of the coating being formed is not particularly limited, but is preferably 0.01 to 10 μm and more preferably 0.02 to 5 μm.

Hereinafter, the aluminum substrate that is used in the coating-forming step will be described, and then a method for forming the coating on the aluminum substrate will be described.

<Aluminum Substrate>

The aluminum substrate is not particularly limited, and it is possible to use, for example, well-known aluminum substrates such as alloy numbers 1085, 1N30, 3003, and the like described in JIS standards H4000. Meanwhile, the aluminum substrate is an alloy plate containing aluminum as a main component and a small amount of a foreign element.

The thickness of the aluminum substrate is not particularly limited, but is preferably 5 to 1,000 μm, more preferably 5 to 100 μm, and particularly preferably 10 to 30 μm.

<Method for Forming Coating>

The method for forming the coating is not particularly limited, and a well-known method of the related art can be used, but a method by an electrochemical treatment such as anodizing is preferred. In a case in which the coating is formed by an electrochemical treatment, the distance between an electrode and the aluminum substrate is not particularly limited, but is preferably 1 to 100 mm and more preferably 5 to 50 mm since the effect of the present invention is more favorable.

The coating may be continuously formed while transporting the aluminum substrate along an electrode in an electrolytic solution (continuous treatment) or may be formed by batch (batch treatment). Among these, the continuous treatment is preferred.

(Aluminum Hydroxide Coating)

In a case in which an aluminum hydroxide coating is formed in the coating-forming step, it is possible to appropriately employ, for example, the conditions or the apparatuses described in Paragraphs "0013" to "0026" of JP2011-201123A.

The conditions for forming the aluminum hydroxide coating vary in diverse manners depending on an electrolytic solution being used and thus cannot be determined uniformly; however, generally, the concentration of an electrolytic solution in a range of 1% to 80% by mass, the liquid temperature in a range of 5° C. to 70° C., the current density in a range of 0.5 to 60 A/dm$^2$, the voltage in a range of 1 to 100 V, and the electrolysis duration in a range of 1 second to 20 minutes are appropriate and are adjusted so as to obtain a desired amount of a coating.

The electrochemical treatment is preferably carried out using nitric acid, hydrochloric acid, sulfuric acid, phosphoric acid, oxalic acid, or a mixed acid of two or more thereof as an electrolytic solution.

In a case in which the electrochemical treatment is carried out in an electrolytic solution containing nitric acid and hydrochloric acid, direct current or alternating current may be applied between the aluminum substrate and a counter electrode. In a case in which direct current is applied to the aluminum substrate, the current density is preferably 1 to 60 A/dm$^2$ and more preferably in a range of 5 to 50 A/dm$^2$. In a case in which the electrochemical treatment is carried out continuously, the electrochemical treatment is preferably carried out using a liquid power feeding method in which power is fed to the aluminum substrate through an electrolytic solution. The electricity quantity is not particularly limited, but is preferably 100 to 1,000 C/dm$^2$.

The amount of the aluminum hydroxide coating being formed is preferably 0.05 to 50 g/m$^2$ and more preferably 0.1 to 10 g/m$^2$.

(Aluminum Oxide Coating)

In the case of forming the aluminum oxide coating, it is possible to use, for example, the same treatment as well-known anodizing of the related art.

As the anodizing, it is possible to appropriately employ, for example, the conditions or the apparatuses described in Paragraphs "0063" to "0073" of JP2012-216513A.

The conditions for forming the aluminum oxide coating vary in diverse manners depending on an electrolytic solution being used and thus cannot be determined uniformly, but the ordinary conditions are the same as those for the above-described aluminum hydroxide coating.

In the present invention, anodizing that is carried out in a sulfuric acid solution is preferred.

In a case in which anodizing is carried out in an electrolytic solution containing sulfuric acid, direct current or alternating current may be applied between the aluminum substrate and a counter electrode. In a case in which direct current is applied to the aluminum substrate, the current density is preferably 1 to 60 A/dm$^2$ and more preferably 5 to 40 A/dm$^2$. In a case in which the anodizing is carried out continuously at a fast speed, it is preferable to conduct an electric current at a low current density of 5 to 10 A/dm$^2$ in the beginning of the anodizing and increase the current density to 30 to 50 A/dm$^2$ or higher as the anodizing proceeds so as to prevent the concentration of the electric current in a portion of the aluminum substrate and the consequent occurrence of so-called "burning". In a case in which the anodizing is carried out continuously, the anodizing is preferably carried out using a liquid power feeding method in which power is fed to the aluminum substrate through the electrolytic solution.

The amount of the aluminum oxide coating being formed by the anodizing is preferably 0.05 to 50 g/m$^2$ and more preferably 0.1 to 10 g/m$^2$.

[Partial Coating Removal Step]

The partial coating removal step is a step of removing, out of the coating formed in the coating-forming step, the coating present on portions in which the through-holes need to be formed. The portions in which the through-holes need to be formed can be appropriately selected, and examples thereof include regions in a substantially circular shape which are regularly arranged as in an example described below. Meanwhile, in this case, generally, pores penetrating the coating on these regions are formed. In addition, in this case, the shape of the pore is not particularly limited, but is preferably a cylindrical shape. The diameter of the pore is not particularly limited, but is preferably 0.1 to 1,000 μm and more preferably 1 to 100 μm.

A method for removing the coating is not particularly limited, but is preferably a method other than an electrochemical melting treatment. Examples of the above-described method include a laser process, a discharge process, an imprinting process, a drilling process, a lithography process, and the like. Among these, a laser process, a discharge process, and an imprinting process are preferred and a laser process is more preferred since the effect of the present invention is more favorable.

<Laser Process>

As the laser process, a well-known method of the related art can be appropriately used. As the laser, a fiber laser, an yttrium-aluminum-carbonate (YAG) laser, a CO2 laser, an excimer laser, or the like is preferably used. Among these, a fiber laser is preferred since the effect of the present invention is more favorable. The coating can be removed by adjusting the focus of a laser beam being radiated using an optical system such as a lens. In addition, the laser beam-radiation surface can also be adjusted to a desired shape such as a truly spherical shape, an elliptical shape, or a rectangular shape by passing the laser beam through a filter.

In the laser process, a laser beam-radiation apparatus may be moved or only the laser beam being radiated may be scanned using a mirror or the like and formed. Furthermore, the coating can be removed in a desired shape by driving a stage vertically or horizontally.

<Discharge Process>

The discharge process is a method in which a discharge phenomenon is used and a method in which the coating is removed by repeating pulse arc discharge between the coating and an electrode bar or the like. Examples thereof include a variety of discharge processes such as wire discharge depending on the shape of an electrode that is used in the discharge process. Depending on the shape or size of the coating to be removed, aluminum, copper, zinc, and a variety of alloys such as beryllium copper can be used as a material of the electrode bar.

<Imprinting Process>

The imprinting process is a method in which a mold having a desired shape is pressed onto the coating. As the imprinting process, a well-known method of the related art can be appropriately used.

[Through-Hole-Forming Step]

The through-hole-forming step is a step of forming the through-holes in the aluminum substrate by carrying out an electrochemical melting treatment on the aluminum substrate after the above-described partial coating removal step. It is considered that, when an electrochemical treatment is carried out, the portions from which the coating has been removed in the above-described partial coating removal step serve as starting points, and the aluminum substrate is selectively melted.

<Electrochemical Melting Treatment>

In the above-described electrochemical melting treatment, it is possible to use direct current or alternating current and use an acidic solution as the electrolytic solution. Particularly, the electrochemical melting treatment is preferably carried out using at least one acid of nitric acid or hydrochloric acid, and the electrochemical melting treatment is more preferably carried out using nitric acid. In addition, the electrochemical melting treatment is still more preferably carried out using an acid mixture of at least one of sulfuric acid, phosphoric acid, or oxalic acid in addition to the above-described acids.

In the present invention, as the acidic solution which is the electrolytic solution, it is possible to use, in addition to the above-described acids, electrolytic solutions described in the respective specifications of U.S. Pat. Nos. 4,671,859A, 4,661,219A, 4,618,405A, 4,600,482A, 4,566,960A, 4,566,958A, 4,566,959A, 4,416,972A, 4,374,710A, 4,336,113A, and 4,184,932A.

The concentration of the acidic solution is preferably in a range of 0.1% to 2.5% by mass and more preferably in a range of 0.2% to 2.0% by mass. In addition, the liquid temperature of the acidic solution is preferably in a range of 20° C. to 80° C. and more preferably in a range of 30° C. to 60° C.

In addition, as an aqueous solution including the above-described acid as a main body, it is possible to use an aqueous solution obtained by adding at least one of a nitric acid compound having nitric acid ions such as aluminum nitrate, sodium nitrate, or ammonium nitrate, a hydrochloric acid compound having hydrochloric acid ions such as aluminum chloride, sodium chloride, or ammonium chloride, or a sulfuric acid compound having sulfuric acid ions such as aluminum sulfate, sodium sulfate, or ammonium sulfate to an aqueous solution of an acid which has a concentration of 1 to 100 g/L in a range of 1 g/L to saturation.

In addition, the aqueous solution including the above-described acid as the main body may contain metals which are included in an aluminum alloy such as iron, copper, manganese, nickel, titanium, magnesium, and silica. A liquid obtained by adding aluminum chloride, aluminum nitrate, aluminum sulfate, or the like to an aqueous solution of an acid having a concentration in a range of 0.1% to 2% by mass so that the concentration of aluminum ions reaches 1 to 100 g/L is preferably used.

In the electrochemical melting treatment, direct current is mainly used; however, in a case in which alternating current is used, the alternating-current power source wave is not particularly limited, and a sine wave, a square wave, a trapezoidal wave, a triangular wave, and the like can be used, and, among these, a square wave or a trapezoidal wave is preferred, and a trapezoidal wave is particularly preferred.

(Nitric Acid Melting Treatment)

In the present invention, it is possible to easily form the through-holes by an electrochemical melting treatment using an electrolytic solution containing nitric acid as a main body (hereinafter, also abbreviated as "nitric acid melting treatment").

Here, the nitric acid melting treatment is preferably an electrolytic treatment which is carried out using direct currents under conditions of an average current density set to 5 A/dm$^2$ or higher and an electricity quantity set to 50 C/dm$^2$ or greater since it is easier to control melting points for forming the through-holes. Meanwhile, the average current density is preferably 100 A/dm$^2$ or lower, and the electricity quantity is preferably 10,000 C/dm$^2$ or less.

In addition, the concentration or temperature of the electrolytic solution in the nitric acid melting treatment is not particularly limited, and it is possible to carry out electrolysis using a nitric acid electrolytic solution having a high concentration, for example, a nitric acid concentration in a range of 15% to 35% by mass at 30° C. to 60° C. or carry out electrolysis using a nitric acid electrolytic solution having a nitric acid concentration in a range of 0.7% to 2% by mass at a high temperature, for example, at 80° C. or higher.

In addition, it is possible to carry out electrolysis using an electrolytic solution obtained by mixing at least one of sulfuric acid, oxalic acid, and phosphoric acid having a concentration of 0.1% to 50% by mass into the above-described nitric acid electrolytic solution.

(Hydrochloric Acid Melting Treatment)

In the present invention, it is possible to easily form the through-holes by an electrochemical melting treatment using an electrolytic solution containing hydrochloric acid as a main body (hereinafter, also abbreviated as "hydrochloric acid melting treatment").

Here, the hydrochloric acid melting treatment is preferably an electrolytic treatment which is carried out using direct current under conditions of an average current density set to 5 A/dm$^2$ or higher and an electricity quantity of set to 50 C/dm$^2$ or greater since it is easier to control melting points of through-hole formation. Meanwhile, the average current density is preferably 100 A/dm$^2$ or lower, and the electricity quantity is preferably 10,000 C/dm$^2$ or less.

In addition, the concentration or temperature of the electrolytic solution in the hydrochloric acid melting treatment is not particularly limited, and it is possible to carry out electrolysis using a hydrochloric acid electrolytic solution having a high concentration, for example, a hydrochloric acid concentration in a range of 10% to 35% by mass at 30° C. to 60° C. or carry out electrolysis using a hydrochloric acid electrolytic solution having a hydrochloric acid concentration in a range of 0.7% to 2% by mass at a high temperature, for example, at 80° C. or higher.

In addition, it is possible to carry out electrolysis using an electrolytic solution obtained by mixing at least one of sulfuric acid, oxalic acid, or phosphoric acid having a concentration of 0.1% to 50% by mass into the above-described hydrochloric acid electrolytic solution.

[Coating Removal Step]

The manufacturing method of the present invention may further include a coating removal step of removing the coating after the above-described through-hole-forming step.

The coating is preferably removed by an acid etching treatment or an alkali etching treatment.

<Acid Etching Treatment>

The acid etching treatment is preferably a treatment in which the aluminum hydroxide coating is melted using a solution that melts aluminum hydroxides more preferentially than aluminum (hereinafter, also referred to as "the aluminum hydroxide melting liquid") or a treatment in which the aluminum oxide coating is melted using a solution that melts aluminum oxides more preferentially than aluminum (hereinafter, also referred to as "the alumina melting liquid").

(Aluminum Hydroxide Melting Liquid)

The aluminum hydroxide melting liquid is preferably an aqueous solution including at least one selected from the group consisting of, for example, nitric acid, hydrochloric acid, sulfuric acid, phosphoric acid, oxalic acid, a chromium compound, a zirconium-based compound, a titanium-based compound, a lithium salt, a cerium salt, a magnesium salt, sodium silicofluoride, zinc fluoride, a manganese compound, a molybdenum compound, a magnesium compound, a barium compound, and a halogen single body.

Specific examples of the chromium compound include chromium (III) oxide, anhydrous chromium (VI) acid, and the like.

Examples of the zirconium-based compound include ammonium fluorozirconate, zirconium fluoride, and zirconium chloride.

Examples of the titanium compound include titanium oxide and titanium sulfide.

Examples of the lithium salt include lithium fluoride and lithium chloride.

Examples of the cerium salt include cerium fluoride and cerium chloride.

Examples of the magnesium salt include magnesium sulfide.

Examples of the manganese compound include sodium permanganate and calcium permanganate.

Examples of the molybdenum compound include sodium molybdate.

Examples of the magnesium compound include magnesium fluoride-pentahydrate.

Examples of the barium compound include barium oxide, barium acetate, barium carbonate, barium chlorate, barium chloride, barium fluoride, barium iodide, barium lactate, barium oxalate, barium perchlorate, barium selenate, barium selenite, barium stearate, barium sulfite, barium titanate, barium hydroxide, barium nitrate, hydrates thereof, and the like.

Among the above-described barium compounds, barium oxide, barium acetate, and barium carbonate are preferred, and barium oxide is particularly preferred.

Examples of the halogen single body include chlorine, fluorine, and bromine.

Among these, the aluminum hydroxide melting liquid is preferably an aqueous solution containing an acid, examples of the acid include nitric acid, hydrochloric acid, sulfuric acid, phosphoric acid, oxalic acid, and the like, and the acid may be a mixture of two or more acids.

The concentration of the acid is preferably 0.01 mol/L or higher, more preferably 0.05 mol/L or higher, and still more preferably 0.1 mol/L or higher. There is no particular upper limit, but the upper limit is generally 10 mol/L or lower and more preferably 5 mol/L or lower.

(Alumina Melting Liquid)

The alumina melting liquid is preferably an aqueous solution containing at least one selected from the group consisting of a chromium compound, nitric acid, sulfuric acid, phosphoric acid, a zirconium-based compound, a titanium-based compound, a lithium salt, a cerium salt, a magnesium salt, sodium silicofluoride, zinc fluoride, a manganese compound, a molybdenum compound, a magnesium compound, a barium compound, and a halogen single body. Specific examples and preferred aspects of the respective compounds are the same as those of the above-described aluminum hydroxide melting liquid.

Among these, the alumina melting liquid is preferably an aqueous solution containing an acid, examples of the acid include sulfuric acid, phosphoric acid, nitric acid, hydrochloric acid, and the like, and the acid may be a mixture of two or more acids.

The concentration of the acid is preferably 0.01 mol/L or higher, more preferably 0.05 mol/L or higher, and still more preferably 0.1 mol/L or higher. There is no particular upper limit, but the upper limit is generally 10 mol/L or lower and more preferably 5 mol/L or lower.

(Method for Acid Etching Treatment)

The acid etching treatment is preferably carried out by bringing the aluminum plate on which the coating is formed into contact with the above-described melting liquid. A method for bringing the aluminum substrate into contact with the alumina melting liquid is not particularly limited, and examples thereof include a dipping method and a spraying method. Among these, the dipping method is preferred.

The dipping method is a treatment in which the aluminum plate on which the coating is formed is dipped into the above-described melting liquid. During the dipping treatment, it is preferable to carry out stirring since the treatment is carried out evenly.

The duration of the dipping treatment is preferably 10 minutes or longer, more preferably one hour or longer, and still more preferably three hours or longer and five hours or longer.

<Alkali Etching Treatment>

The alkali etching treatment is a treatment in which the surface layer is melted by bringing the coating into contact with an alkali solution.

(Alkali Solution)

Examples of alkalis that can be used in the alkali solution include caustic alkalis and alkali metal salts. Specific examples of caustic alkalis include sodium hydroxide (caustic soda) and caustic potash. In addition, examples of alkali metal salts include alkali metal silicates such as sodium metasilicate, sodium silicate, potassium metasilicate, and potassium silicate; alkali metal carbonates such as sodium carbonate and potassium carbonate; alkali metal aluminate such as sodium aluminate and potassium aluminate; alkali metal aldonates such as sodium gluconate and potassium gluconate; and alkali metal hydrogenphosphate such as sodium diphosphate, potassium diphosphate, sodium triphosphate, and potassium triphosphate. Among these, solutions of caustic alkalis and solutions containing both caustic alkali and alkali metal aluminate are preferred from the viewpoint of the fast etching rates and the cheap prices. Particularly, an aqueous solution of sodium hydroxide is preferred.

The concentration of the alkali solution is preferably in a range of 0.1% to 50% by mass and more preferably in a range of 0.2% to 10% by mass. In a case in which the alkali solution has aluminum ions melted therein, the concentration of aluminum ions is preferably in a range of 0.01% to 10% by mass and more preferably in a range of 0.1% to 3% by mass. The temperature of the alkali solution is preferably in a range of 10° C. to 90° C. The treatment duration is preferably in a range of 1 second to 120 seconds.

(Method for Alkali Etching Treatment)

Examples of a method for bringing the coating into contact with the alkali solution include a method in which the aluminum plate on which the coating is formed is passed through a tank including the alkali solution, a method in which the aluminum plate on which the coating is formed is immersed in a tank including the alkali solution, and a method in which the alkali solution is sprayed to the surface of the aluminum plate on which the coating is formed.

[Roughening Treatment Step]

The manufacturing method of the present invention may further include a roughening treatment step in which an electrochemical roughening treatment (hereinafter, also referred to as "the electrolytic roughening treatment") is carried out after the above-described coating removal step.

In a case in which the electrolytic roughening treatment is carried out, thereby roughening the surface after the coating removal step, adhesiveness to layers including active material improves, and an increase in the surface area leads to an increase in the contact area, and thus, in a case in which the aluminum plate obtained using the manufacturing method of the present invention is used as a collector, the capacity retention of storage devices increases.

In the electrolytic roughening treatment, it is possible to appropriately employ, for example, conditions or devices described in Paragraphs "0041" to "0050" of JP2012-216513A.

<Nitric Acid Electrolysis>

In the present invention, it is possible to easily form recess portions having an average opening diameter (average pore diameter) in a range of 0.5 μm to 3.0 μm at a density of 10 recess portions/100 μm$^2$ or higher by means of an electrochemical roughening treatment in which an electrolytic solution including nitric acid as a main body is used (hereinafter, also abbreviated as "the nitric acid electrolysis").

Here, the nitric acid electrolysis is preferably an electrolytic treatment which is carried out using alternating current under conditions of a peak current density set to 30 A/dm$^2$ or higher, an average current density set to 13 A/dm$^2$ or higher, and a quantity of electricity set to 150 C/dm$^2$ or greater since it becomes possible to form uniform recess portions at a high density. Meanwhile, the peak current density is preferably 100 A/dm$^2$ or lower, the average current density is preferably 40 A/dm$^2$ or lower, and the quantity of electricity is preferably 400 C/dm$^2$ or less.

In addition, the concentration or temperature of the electrolytic solution in the nitric acid electrolysis is not particularly limited, and it is possible to carry out electrolysis using a nitric acid electrolytic solution having a high concentration, for example, a nitric acid concentration in a range of 15% to 35% by mass at 30° C. to 60° C. or carry out electrolysis using a nitric acid electrolytic solution having a nitric acid concentration in a range of 0.7% to 2% by mass at a high temperature, for example, at 80° C. or higher.

<Hydrochloric Acid Electrolysis>

In the present invention, it is possible to form recess portions having an average opening diameter (average pore diameter) in a range of 0.5 μm to 3.0 μm at a density of 10 recess portions/100 μm$^2$ or higher by means of an electrochemical roughening treatment in which an electrolytic solution including hydrochloric acid as a main body is used (hereinafter, also abbreviated as "the hydrochloric acid electrolysis").

Here, the hydrochloric acid electrolysis is preferably an electrolytic treatment which is carried out using alternating current under conditions of a peak current density set to 30 A/dm$^2$ or higher, an average current density set to 13 A/dm$^2$ or higher, and a quantity of electricity set to 150 C/dm$^2$ or greater since it becomes possible to form uniform recess portions at a high density. Meanwhile, the peak current density is preferably 100 A/dm$^2$ or lower, the average current density is preferably 40 A/dm$^2$ or lower, and the quantity of electricity is preferably 400 C/dm$^2$ or less.

[Metal Coating Step]

The manufacturing method of the present invention may include a metal coating step in which part or all of the surfaces of the aluminum plate including at least the inner walls of the through-holes are coated with a metal other than aluminum after the above-described coating removal step.

Here, "part or all of the surfaces of the aluminum plate including at least the inner walls of the through-holes are coated with a metal other than aluminum" means that, out of all the surfaces of the aluminum plate including the inner walls of the through-holes, at least the inner walls of the through-holes are coated, and the surfaces other than the inner walls may not be coated or may be wholly or partially coated.

[Water Washing Treatment]

In the present invention, it is preferable to carry out water washing after the completion of the respective steps described above. In the water washing, it is possible to use pure water, well water, tap water, or the like. In order to prevent the treatment liquids from being carried to the subsequent steps, a nipping device may be used.

[Applications]

The aluminum plate manufactured using the manufacturing method of the present invention (hereinafter, simply referred to as "the aluminum plate of the present invention") is preferably used as a collector that is used for a positive electrode or a negative electrode in a storage device. In addition, additionally, the aluminum plate can be preferably used as a heat-resistant fine particle filter, an acoustic absorption material, and the like.

[Collector for Storage Device]

A collector for a storage device of the present invention (hereinafter, also abbreviated as "the collector of the present invention") is a collector for a storage device which is constituted of an aluminum plate manufactured using the above-described manufacturing method of the present invention.

Since the aluminum plate has a plurality of through-holes in the thickness direction at a high density, in the case of being used in a lithium-ion capacitor, the collector of the present invention is capable of pre-doping lithium ions within a short period of time and capable of more uniformly dispersing lithium ions. In addition, the adhesiveness to an active material layer or activated charcoal becomes favorable, and it is possible to produce a storage device being excellent in terms of the cycle characteristics or the output characteristics and the productivity such as the coating aptitude.

[Storage Device]

A storage device of the present invention is a storage device having a positive electrode, a negative electrode, and an electrolytic solution (electrolyte) and a storage device in which the above-described collector of the present invention is used as at least one of the positive electrode and the negative electrode.

Here, as the specific constitution and applied applications of the storage device (particularly, secondary battery), it is possible to appropriately employ the materials or applications described in Paragraphs "0090" to "0123" of JP2012-216513A, the contents of which are incorporated into the present specification by reference.

[Positive Electrode]

The positive electrode for which the collector of the present invention is used is a positive electrode having a positive electrode collector in which the collector of the present invention is used for the positive electrode and a layer including a positive electrode active material (positive electrode active material layer) which is formed on the surface of the positive electrode collector.

Here, regarding the positive electrode active material and a conductive material, a binding agent, a solvent, and the like which may be included in the positive electrode active material layer, it is possible to appropriately employ the materials described in Paragraphs "0077" to "0088" of JP2012-216513A, the content of which is incorporated herein by reference.

[Negative Electrode]

The negative electrode for which the collector of the present invention is used is a negative electrode having a negative electrode collector in which the collector of the present invention is used for the negative electrode and a layer including a negative electrode active material which is formed on the surface of the negative electrode collector.

Here, regarding the negative electrode active material, it is possible to appropriately employ the material described in Paragraph "0089" of JP2012-216513A, the content of which is incorporated herein by reference.

[Apparatus for Manufacturing Aluminum Plate]

An apparatus for manufacturing an aluminum plate of the present invention is an apparatus for manufacturing an aluminum plate which is used in the above-described manufacturing method of the present invention and includes means for forming a coating of an aluminum compound on a surface of an aluminum substrate having a thickness of 5 to 1,000 μm, means for removing, out of the coating, the coating present on portions in which through-holes need to be formed, and means for forming the through-holes in the aluminum substrate by carrying out an electrochemical melting treatment on the aluminum substrate in which, out of the coating, the coating present on the portions in which through-holes need to be formed has been removed. The specific examples and preferred aspects of the respective means are as described above.

EXAMPLES

Hereinafter, the present invention will be described in more detail using examples, but the present invention is not limited thereto.

[Manufacturing of Aluminum Plate]

An aluminum plate was manufactured as described below using an aluminum substrate having an average thickness of 20 μm and a size of 200 mm×300 mm (JIS H-4160, alloy number: 1N30-H, aluminum purity: 99.30%).

Example 1

(Coating-Forming Step)

An electrochemical treatment (current density: 25 A/dm$^2$) was carried out using a solution having a sulfuric acid concentration of 15%, an aluminum concentration of 5%, and a liquid temperature of 50° C. and the above-described aluminum substrate as an anode, thereby forming an aluminum oxide coating (thickness: 1 μm) on a surface of the aluminum substrate.

(Partial Coating Removal Step)

After that, out of the formed aluminum oxide coating, the aluminum oxide coating present in portions in which through-holes needed to be formed (regions in a substantially circular shape having a diameter of substantially 20 μm which were arranged at intervals of approximately 100 μm) was removed by a fiber laser process (pulse width: 5 ns, frequency: 700 kHz, output: 12 W).

(Through-hole-Forming Step)

Next, an electrochemical melting treatment (current density: 20 A/dm$^2$, total electricity quantity: 1,000 c/dm$^2$) was carried out using a solution having a sulfuric acid concentration of 1%, a nitric acid concentration of 1%, an aluminum concentration of 1%, and a liquid temperature of 50° C. and the aluminum substrate after the partial coating removal step as an anode, thereby forming through-holes in the aluminum substrate. In the above-described manner, an aluminum plate having the plurality of through-holes in the thickness direction (having the aluminum oxide coating) was manufactured.

(Coating Removal Step)

Furthermore, the obtained aluminum plate (having the aluminum oxide coating) was immersed in an aqueous solution (liquid temperature: 35° C.) having a sodium hydroxide concentration of 5% by mass and an aluminum ion concentration of 0.5% by mass for three seconds, thereby melting and removing the aluminum oxide coating.

After that, the aluminum substrate was washed with water by means of spraying and dried, thereby manufacturing an aluminum plate having the plurality of through-holes in the thickness direction (having no aluminum oxide coatings).

Example 2

An aluminum plate (having no aluminum oxide coatings) was manufactured according to the same order as in Example 1 except for the fact that the thickness of an aluminum oxide coating being formed was set to 10 μm in the coating-forming step.

Example 3

An aluminum plate (having no aluminum oxide coatings) was manufactured according to the same order as in Example 1 except for the fact that the thickness of an aluminum oxide coating being formed was set to 0.02 μm in the coating-forming step.

Example 4

An aluminum plate (having no aluminum hydroxide coatings) was manufactured according to the same order as in Example 1 except for the fact that the coating-forming step and the coating removal step were carried out as described below.

(Coating-Forming Step)

An electrochemical treatment (current density: 25 A/dm$^2$) was carried out using a solution having a sulfuric acid concentration of 1%, a nitric acid concentration of 1%, an aluminum concentration of 1%, and a liquid temperature of 50° C. and the above-described aluminum substrate as a cathode, thereby forming an aluminum hydroxide coating (thickness: 1 μm) on a surface of the aluminum substrate.

(Coating Removal Step)

The obtained aluminum plate (having the aluminum hydroxide coating) was immersed in an aqueous solution (liquid temperature: 35° C.) having a sodium hydroxide concentration of 5% by mass and an aluminum ion concentration of 0.5% by mass for 30 seconds and then immersed in an aqueous solution (liquid temperature: 50° C.) having a sulfuric acid concentration of 30% and an aluminum ion concentration of 0.5% by mass for 20 seconds, thereby melting and removing the aluminum hydroxide coating.

After that, the aluminum substrate was washed with water by means of spraying and dried, thereby manufacturing an aluminum plate having the plurality of through-holes in the thickness direction (having no aluminum hydroxide coatings).

Example 5

An aluminum plate (having no aluminum oxide coatings) was manufactured according to the same order as in Example 1 except for the fact that a discharge process was used instead of the fiber laser process in the partial coating removal step.

Example 6

An aluminum plate (having no aluminum oxide coatings) was manufactured according to the same order as in Example 1 except for the fact that an imprinting process was used instead of the fiber laser process in the partial coating removal step.

Comparative Example 1

An aluminum plate (having no aluminum oxide coatings) was manufactured according to the same order as in Example 1 except for the fact that the partial coating removal step was not carried out, and the through-hole-forming step was carried out after the coating-forming step.

Comparative Example 2

An aluminum plate (having no aluminum hydroxide coatings) was manufactured according to the same order as in Example 4 except for the fact that the partial coating removal step was not carried out, and the through-hole-forming step was carried out after the coating-forming step.

Comparative Example 3

The coating-forming step was not carried out, and through-holes (through-holes having a diameter of substantially 20 μm which were arranged at intervals of approximately 100 μm) were formed in the aluminum substrate by a fiber laser process (pulse width: 5 ns, frequency: 700 kHz, output: 12 W). In the above-described manner, an aluminum plate having the plurality of through-holes in the thickness direction was manufactured.

[Evaluation]

<Location Control Property>

The surface of the obtained aluminum plate (having no coatings) was observed (at a magnification of 200 times) using a scanning electron microscope (SEM), and whether or not the locations of the through-holes were controlled was investigated. Specifically, whether or not the through-holes were regularly arranged at intervals of approximately 100 μm was investigated. In addition, the location control property was evaluated according to the following standards. The results are shown in Table 1. A or B is preferred, and A is more preferred.

A: The locations of the through-holes were controlled.

B: The locations of some of the through-holes were not controlled.

C: The locations of the through-holes were not controlled.

<Presence or Absence of Surface Burrs>

The surface of the obtained aluminum plate (having no coatings) was observed (at a magnification of 200 times) using a scanning electron microscope (SEM), and whether or not burrs were present was investigated. In addition, the presence or absence of burrs on the surface was evaluated according to the following standards. The results are shown in Table 1.

A is preferred.

A: Burrs were not observed.

B: Burrs were observed.

Figure 2:
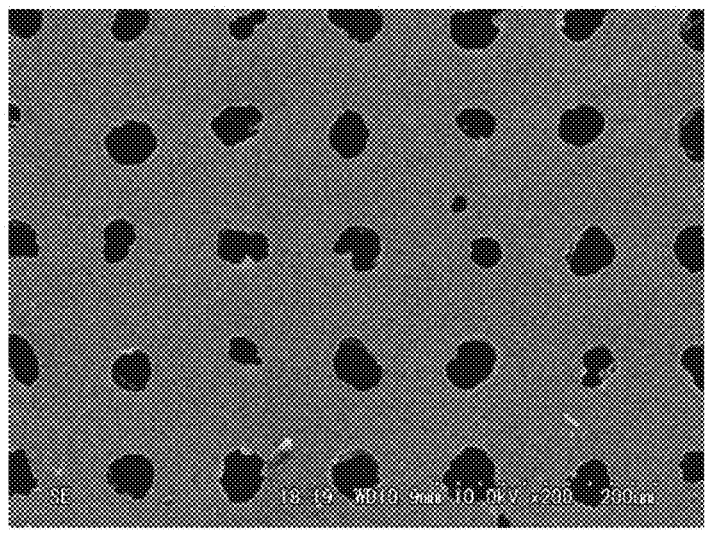
FIG. 2 is a SEM photograph of a surface of an aluminum plate manufactured using a manufacturing method of Example 1.
Figure 3:
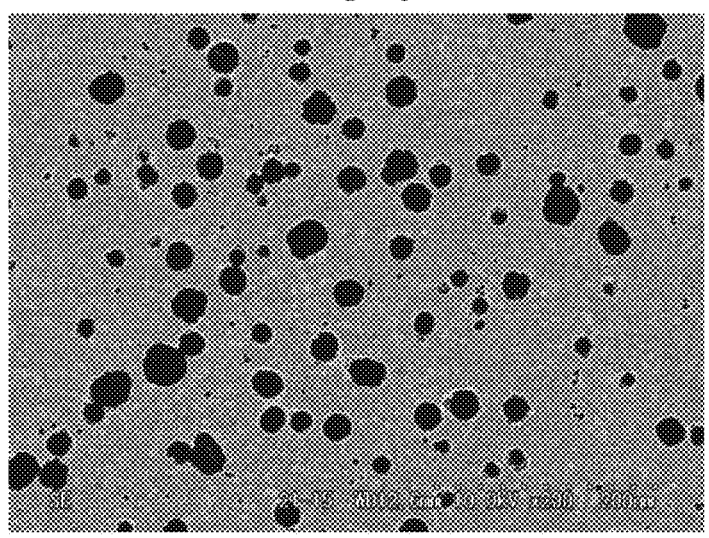
FIG. 3 is a SEM photograph of a surface of an aluminum plate manufactured using a manufacturing method of Comparative Example 1.
Figure 4:
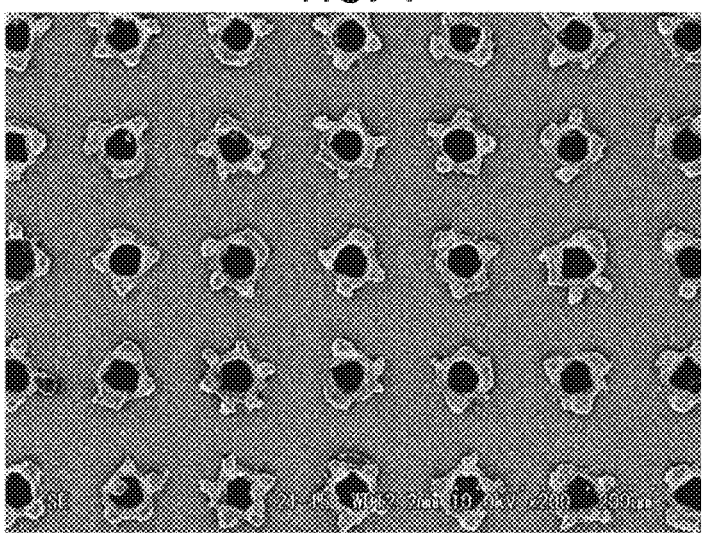
FIG. 4 is a SEM photograph of a surface of an aluminum plate manufactured using a manufacturing method of Comparative Example 3.

FIG. 2 illustrates an SEM photograph of Example 1, FIG. 3 illustrates an SEM photograph of Comparative Example 1, and FIG. 4 illustrates an SEM photograph of Comparative Example 3. As is clear from the SEM photographs, in the aluminum plate obtained using the manufacturing method of Example 1, the locations of the through-holes were controlled. In addition, no burrs were observed. On the other hand, in the aluminum plate obtained using the manufacturing method of Comparative Example 1, the locations of the through-holes were not controlled. In addition, in the aluminum plate obtained using the manufacturing method of Comparative Example 3, the locations of the through-holes were controlled, but burrs were observed.

TABLE 1

| | Coating-forming step | | | | Evaluation | |
|---|---|---|---|---|---|---|
| | Kind of coating | Thickness [μm] | Partial coating removal step | Through-hole-forming step | Location control properly | Presence or absence of surface burrs |
| Example 1 | Aluminum oxide coating | 1 | Laser process | Electrochemical melting treatment | A | A |
| Example 2 | Aluminum oxide coating | 10 | Laser process | Electrochemical melting treatment | A | A |
| Example 3 | Aluminum oxide coating | 0.02 | Laser process | Electrochemical melting treatment | A | A |
| Example 4 | Aluminum hydroxide coating | 1 | Laser process | Electrochemical melting treatment | B | A |
| Example 5 | Aluminum oxide coating | 1 | Discharge process | Electrochemical melting treatment | B | A |
| Example 6 | Aluminum oxide coating | 1 | Imprinting process | Electrochemical melting treatment | B | A |
| Comparative Example 1 | Aluminum oxide coating | 1 | None | Electrochemical melting treatment | C | A |
| Comparative Example 2 | Aluminum hydroxide coating | 1 | None | Electrochemical melting treatment | C | A |
| Comparative Example 3 | None | N/A | None | Laser process | A | B |

As is clear from Table 1, in the aluminum plates manufactured using the manufacturing methods of Examples 1 to 6 in which the through-hole-forming step was carried out after the partial coating removal step was carried out, the locations of the through-holes were controlled (regularly arranged).

Comparison among Examples 1 to 4 shows that the aluminum plates manufactured using the manufacturing methods of Examples 1 to 3 in which the coating formed in the coating-forming step was an aluminum oxide coating, the locations of the through-holes were controlled better.

In addition, comparison among Examples 1, 5, and 6 shows that, in Example 1 in which the coating was removed by a laser process in the partial coating removal step, the locations of the through-holes were controlled better.

On the other hand, in the aluminum plates manufactured using the manufacturing methods of Comparative Examples 1 and 2 in which the through-hole-forming step was carried out without carrying out the partial coating removal step, the locations of the through-holes were not controlled. In addition, in the aluminum plate manufactured using the manufacturing method of Comparative Example 3, the locations of the through-holes were controlled, but burrs were observed.

Meanwhile, in order to use the aluminum plates manufactured using the manufacturing methods of Examples 1 to 6 as a collector for lithium-ion capacitors, lithium ions were pre-doped into the manufactured aluminum plates, and it was found that lithium ions could be (efficiently) doped thereinto within a short period of time. This is assumed to be because the through-holes were regularly arranged.

EXPLANATION OF REFERENCES

1: aluminum substrate
2: coating
3: aluminum substrate having through-holes
4: coating having pores in portions in which through-holes need to be formed
4a: coating having through-holes
5: pore
6: through-hole
10: aluminum plate (having coating)
12: aluminum plate (having no coatings)

What is claimed is:

1. A method for manufacturing an aluminum plate having a plurality of through-holes in a thickness direction, the method comprising:
  a coating-forming step of forming a coating of an aluminum compound on a surface of an aluminum substrate having a thickness of 5 to 1,000 µm;
  a partial coating removal step of removing, out of the coating, the coating present on portions in which the through-holes need to be formed; and
  a through-hole-forming step of forming the through-holes in the aluminum substrate by carrying out an electrochemical melting treatment on the aluminum substrate after the partial coating removal step.

2. The method for manufacturing an aluminum plate according to claim 1,
  wherein the coating is formed by carrying out an electrochemical treatment on the surface of the aluminum substrate.

3. The method for manufacturing an aluminum plate according to claim 1,
  wherein the coating is a coating of aluminum oxide.

4. The method for manufacturing an aluminum plate according to claim 1,
  wherein a thickness of the coating is 0.02 to 10 µm.

5. The method for manufacturing an aluminum plate according to claim 1,
  wherein, in the partial coating removal step, the coating is removed by a laser process.

6. The method for manufacturing an aluminum plate according to claim 1, further comprising:
  a coating removal step of removing the coating after the through-hole-forming step.

7. The method for manufacturing an aluminum plate according to claim 2,
  wherein the coating is a coating of aluminum oxide.

8. The method for manufacturing an aluminum plate according to claim 2,
  wherein a thickness of the coating is 0.02 to 10 µm.

9. The method for manufacturing an aluminum plate according to claim 3,
  wherein a thickness of the coating is 0.02 to 10 µm.

10. The method for manufacturing an aluminum plate according to claim 8,
  wherein a thickness of the coating is 0.02 to 10 µm.

11. The method for manufacturing an aluminum plate according to claim 2,
  wherein, in the partial coating removal step, the coating is removed by a laser process.

12. The method for manufacturing an aluminum plate according to claim 3,
  wherein, in the partial coating removal step, the coating is removed by a laser process.

13. The method for manufacturing an aluminum plate according to claim 4,
  wherein, in the partial coating removal step, the coating is removed by a laser process.

14. The method for manufacturing an aluminum plate according to claim 7,
  wherein, in the partial coating removal step, the coating is removed by a laser process.

15. The method for manufacturing an aluminum plate according to claim 8,
  wherein, in the partial coating removal step, the coating is removed by a laser process.

16. The method for manufacturing an aluminum plate according to claim 9,
  wherein, in the partial coating removal step, the coating is removed by a laser process.

17. The method for manufacturing an aluminum plate according to claim 10,
  wherein, in the partial coating removal step, the coating is removed by a laser process.

18. The method for manufacturing an aluminum plate according to claim 2, further comprising:
  a coating removal step of removing the coating after the through-hole-forming step.

19. The method for manufacturing an aluminum plate according to claim 3, further comprising:
  a coating removal step of removing the coating after the through-hole-forming step.

* * * * *